United States Patent
Okamatsu (10) Patent No.: US 9,543,820 B2
(45) Date of Patent: Jan. 10, 2017

(54) POWER CONVERTER INCLUDING A DC-AC INVERTER AND A CAPACITOR CIRCUIT

(71) Applicant: Panasonic Intellectual Property Management Co., Ltd., Osaka (JP)

(72) Inventor: Masashi Okamatsu, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/651,129

(22) PCT Filed: Dec. 5, 2013

(86) PCT No.: PCT/JP2013/007148
§ 371 (c)(1),
(2) Date: Jun. 10, 2015

(87) PCT Pub. No.: WO2014/097563
PCT Pub. Date: Jun. 26, 2014

(65) Prior Publication Data
US 2015/0311820 A1 Oct. 29, 2015

(30) Foreign Application Priority Data
Dec. 17, 2012 (JP) .................. 2012-274290

(51) Int. Cl.
*H02M 1/12* (2006.01)
*H02M 7/5375* (2006.01)
(Continued)

(52) U.S. Cl.
CPC .............. *H02M 1/12* (2013.01); *H02M 1/36* (2013.01); *H02M 7/48* (2013.01); *H02M 7/537* (2013.01);
(Continued)

(58) Field of Classification Search
CPC .......... H02M 1/32; H02M 7/48; H02M 7/537; H02M 7/5375; H02M 1/12; H02M 1/126
See application file for complete search history.

(56) References Cited

U.S. PATENT DOCUMENTS 5,608,614 A * 3/1997 Ohnishi ............ H02M 1/4208
307/110
2009/0097283 A1 4/2009 Krein et al.
(Continued)

FOREIGN PATENT DOCUMENTS

JP 2008-245497 10/2008
JP 2011-501635 1/2011

OTHER PUBLICATIONS

International Search Report of PCT application No. PCT/JP2013/007148 dated Mar. 11, 2014.

*Primary Examiner* — Fred E Finch, III
*Assistant Examiner* — Rafael O De Leon Domenech
(74) *Attorney, Agent, or Firm* — McDermott Will & Emery LLP (57) ABSTRACT

A power inverter device includes an inverter that converts a direct-current (DC) power to an alternating-current (AC) power having an output AC voltage, and a capacitor circuit electrically connected to the inverter. The capacitor circuit is operable to start supplying a capacitor voltage to the inverter at a time point when a predetermined waiting time lapses from a zero cross point of the output AC voltage at a starting up of the inverter circuit, wherein the capacitor voltage has a phase shifted by π/4 radian from the output AC voltage. The inverter is operable to generate the output AC power based on the capacitor voltage and the DC power. The predetermined waiting time is a duration is equal to 2πn+3π/4 radian or 2πn+7π/4 radian of a phase of the output AC voltage (n is an integer not smaller than zero). This power (Continued)

inverter device can reduce a ripple power of the input power early after the starting-up.

6 Claims, 9 Drawing Sheets

(51) Int. Cl.
    *H02M 1/36*     (2007.01)
    *H02M 7/537*     (2006.01)
    *H02M 7/48*     (2007.01)
    *H02M 1/32*     (2007.01)

(52) U.S. Cl.
    CPC ........... *H02M 7/5375* (2013.01); *H02M 1/126* (2013.01); *H02M 1/32* (2013.01)

(56) References Cited

U.S. PATENT DOCUMENTS

2010/0238690 A1    9/2010   Krein et al.
2011/0305050 A1   12/2011   Krein et al.

\* cited by examiner

POWER CONVERTER INCLUDING A DC-AC INVERTER AND A CAPACITOR CIRCUIT

This application is a U.S. national stage application of the PCT international application No. PCT/JP2013/007148 filed on Dec. 5, 2013, which claims the benefit of foreign priority of Japanese patent application No. 2012-274290 filed on Dec. 17, 2012, the contents all of which are incorporated herein by reference.

TECHNICAL FIELD

The present invention relates to a power inverter device that converts direct-current power to alternating-current power.

BACKGROUND ART

A single-phase power conditioning device as a conventional power inverter device for converting a DC power of a solar cell to an AC power is disclosed in, e.g. PTL 1.

Figure 7:
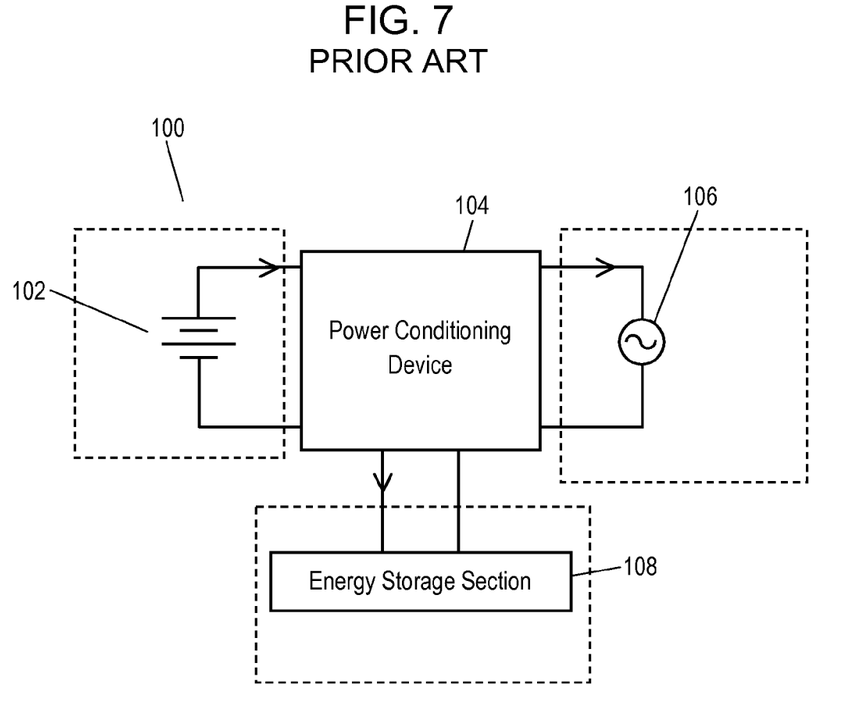
FIG. 7 is a schematic view of a power system including a conventional power conditioning device.

FIG. 7 is a schematic view of power system 100 including power conditioning device 104 disclosed in PTL 1. Power conditioning device 104 is a single-phase power conditioning device. Power system 100 includes energy source 102 and power conditioning device 104 connected to AC load 106 and energy storage section 108 AC load 106 may be single phase-connected to an AC power grid. Energy source 102 is, e.g. a solar cell. Energy storage section 108 is an electricity storage element, such as a capacitor. A control device integrated with power conditioning device 104 functions to maintain the operation of power system 100 at an optimal power point so that a maximum power can be output from energy source 102 whenever power is available. Power conditioning device 104 is, e.g. an inverter.

An operation of power system 100 including power conditioning device 104 will be described below. Power system 100 detects a first AC waveform based on the output from power conditioning device 104. Then, a second AC waveform having the same frequency as that of the first AC waveform is generated by energy storage section 108. The second AC waveform has a phase shifted by $\pi/4$ radian from the phase of the first AC waveform. This operation can consequently minimize a double-frequency ripple power of the power supplied from energy source 102. Specifically, electric energy having the second AC waveform flowing into or out of energy storage section 108 is controlled by the switching operation of an interface section provided between power conditioning device 104 and energy storage section 108. The shifted second AC waveform is tracked to compensate the ripple power having a double frequency.

Power system 100 including power conditioning device 104 (inverter) can reduce the double-frequency ripple power of the power supplied from energy source 102. However, the stable reduction of the ripple power may require a period of time of several tens of seconds during which the power is unstable, hence adversely influencing the operation of AC load 106.

CITATION LIST

Patent Literature

PTL 1: Japanese Patent Laid-Open Publication No. 2011-501635

SUMMARY

A power inverter device includes an inverter that converts a direct-current (DC) power to an alternating-current (AC) power having an output AC voltage, and a capacitor circuit electrically connected to the inverter. The capacitor circuit is operable to start supplying a capacitor voltage to the inverter at a time point when a predetermined waiting time lapses from a zero cross point of the output AC voltage at a starting up of the inverter circuit, wherein the capacitor voltage has a phase shifted by $\pi/4$ radian from the output AC voltage. The inverter is operable to generate the output AC power based on the capacitor voltage and the DC power. The predetermined waiting time is a duration is equal to $2\pi n + 3\pi/4$ radian or $2\pi n + 7\pi/4$ radian of a phase of the output AC voltage (n is an integer not smaller than zero).

This power inverter device can reduce a ripple power of the input power early after the starting-up.

DETAIL DESCRIPTION OF PREFERRED EMBODIMENTS

Exemplary Embodiment 1

Figure 1:
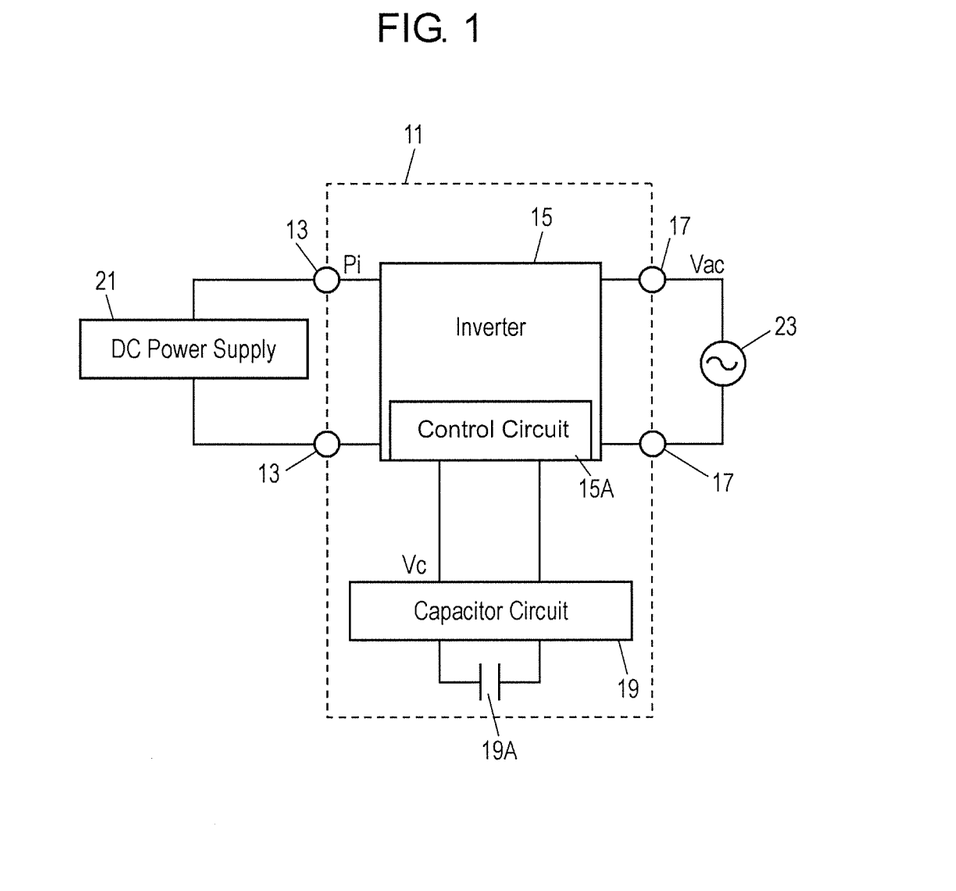
FIG. 1 is a block diagram of a power inverter device in accordance with Exemplary Embodiment 1 of the present invention.

FIG. 1 is a block diagram of power inverter device 11 in accordance with Exemplary Embodiment 1 of the present invention. Power inverter device 11 includes input terminal 13 configured to has direct-current (DC) power input thereto, inverter 15 electrically connected to input terminal 13, output terminal 17 electrically connected to inverter 15, and capacitor circuit 19 electrically connected to inverter 15. Inverter 15 is configured to convert DC power to alternating-current (AC) power having output AC voltage Vac. Output terminal 17 is configured to output the converted AC power. Inverter 15 controls capacitor circuit 19 such that capacitor circuit 19 starts supplying a capacitor voltage Vc having a phase shifted substantially by $\pi/4$ radian from the output AC voltage when a predetermined waiting time lapses from a zero cross point of the output AC voltage during the starting-up of inverter 15. The predetermined waiting time is a duration substantially equal to $2\pi n + 3\pi/4$ radian or $2\pi n + 7\pi/4$ radian of a phase of the output AC voltage (n is an integer not smaller than zero).

Power system 100 shown in FIG. 7 including power conditioning device 104 (inverter) can reduce the ripple power of the double-frequency of the power supplied from energy source 102. However, when the control of power system 100 is performed immediately after the starting-up of the inverter, the ripple power may not be reduced immediately. The impedance of power system 100 may cause a period of time of several tens of seconds until the ripple power is reduced stably. During the period of time, the power is unstable, and may influence the operation of AC load 106.

In power inverter device 11 in accordance with Embodiment 1 shown in FIG. 1, when the predetermined waiting time lapses from the zero cross point of output AC voltage Vac after the starting-up of inverter 15, capacitor circuit 19 starts supplying, to inverter 15, a waveform of capacitor voltage Vc having a phase shifted to be advanced by $\pi/4$ radian from a phase of output AC voltage Vac. As a result, a direction along which capacitor voltage Vc changes during the initial charging of the capacitor of capacitor circuit 19 matches a direction along which capacitor voltage Vc changes during the stable driving of power inverter device 11. Hence, even when the waveform of capacitor voltage Vc having a phase substantially shifted by $\pi/4$ radian is supplied from capacitor circuit 19 to inverter 15, a waveform substantially equal to the waveform of capacitor voltage Vc during stable driving is obtained, thus immediately stabling ripple power. Thus, the ripple power included in the input power Pi input to inverter 15 can be reduced early after the starting-up of power inverter device 11.

A configuration and operation of power inverter device 11 in accordance with Embodiment 1 will be described below. According to Embodiment 1, DC power output from DC power source 21 is supplied to input terminal 13 of power inverter device 11, and is converted to AC power output from output terminal 17.

As shown in FIG. 1, input terminal 13 of power inverter device 11 is electrically connected to DC power source 21. According to Embodiment 1, DC power source 21 is a solar cell. The DC power generated by DC power source 21 is input from input terminal 13 to power inverter device 11.

Output terminal 17 of power inverter device 11 is electrically connected to AC power grid 23. The AC power output from power inverter device 11 is supplied to a load, such as an electrical appliance, connected via AC power grid 23. This AC power may flow reversely to AC power grid 23. Output terminal 17 may be electrically connected only to the load without AC power grid 23 to supply the AC power only to the load.

Input terminal 13 of power inverter device 11 is electrically connected to inverter 15. Inverter 15 includes switching elements. The switching elements switch the DC power input from input terminal 13. Power inverter device 11 is configured to convert the DC power to an AC power, such as AC power having output AC voltage Vac of 100V having a frequency of 60 Hz, that is suitable for AC power grid 23. Power inverter device 11 includes control circuit 15A that entirely controls power inverter device 11 including inverter 15. An output of inverter 15 is connected to output terminal 17.

Inverter 15 is electrically connected to capacitor circuit 19. Capacitor circuit 19 includes capacitor 19A storing power. Capacitor 19A is configured to be charged by power supplied from inverter 15. Capacitor circuit 19 is configured to generate, from the power stored in capacitor 19A, capacitor voltage Vc shifted substantially by $\pi/4$ radian from output AC voltage Vac generated by inverter 15 to supply capacitor voltage Vc to inverter 15. In the following description, the waveform substantially shifted to be advanced by $\pi/4$ radian may be a waveform shifted to be advanced by $\pi/4$ radian by capacitor circuit 19 within a phase error range during waveform generation. Specifically, when the waveform has a phase having an error of $\pm e$ radian, a waveform shifted by $\pi/4$ radian is a waveform shifted substantially by $\pi/4 \pm e$ radian.

The operation of power inverter device 11 will be described below.

First, a steady operation that is an operation performed when a sufficient time lapses from the starting-up of power inverter device 11 will be described below. Control circuit 15A of inverter 15 acquires the waveform of output AC voltage Vac output from inverter 15. Then, control circuit 15A utilizes the charge/discharge power of capacitor 19A stored in capacitor circuit 19 to generate capacitor voltage Vc shifted substantially by $\pi/4$ radian from output AC voltage Vac, and supplies capacitor voltage Vc to inverter 15. Inverter 15 includes an interface circuit to acquire capacitor voltage Vc generated by capacitor circuit 19. The interface circuit is controlled by control circuit 15A. Control circuit 15A controls capacitor circuit 19 such that, based on the charge/discharge of capacitor 19A, capacitor circuit 19 generates capacitor voltage Vc having a phase shifted substantially by $\pi/4$ radian from output AC voltage Vac. Control circuit 15A controls the interface circuit such that capacitor voltage Vc generated by capacitor circuit 19 is supplied to inverter 15. This operation can reduce ripple power of input power Pi input from DC power source 21 to inverter 15.

When the use of power inverter device 11 is completed, capacitor 19A of capacitor circuit 19 is self-discharged due to an internal resistance of capacitor 19A. Therefore, when power inverter device 11 starts up again, no more power can be discharged from capacitor 19A. Even when capacitor circuit 19 tries to generate capacitor voltage Vc shifted substantially by $\pi/4$ radian immediately after such a status, the duration for which capacitor 19A is charged causes capacitor voltage Vc at the initial stage of the start-up to have a waveform different from that of capacitor voltage Vc in the steady operation. Capacitor voltage Vc having such a waveform may not sufficiently reduce the ripple power of input power Pi sufficiently.

Figure 2:
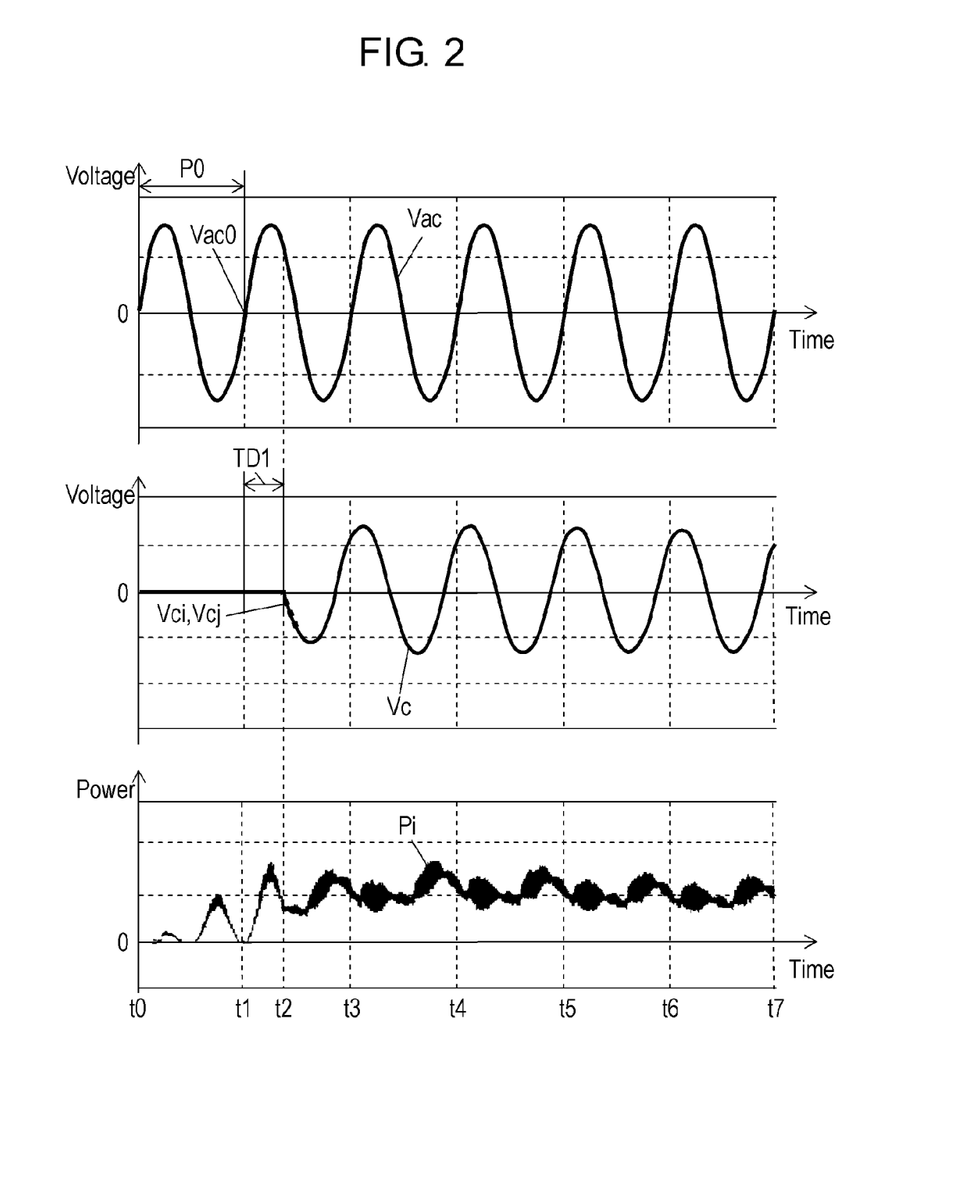
FIG. 2 illustrates signals of the power inverter device in accordance with Embodiment 1.

An operation of power inverter device 11 in accordance with Embodiment 1 at the starting up thereof will be described below. FIG. 2 illustrates output AC voltage Vac and capacitor voltage Vc of power inverter device 11 and input power Pi input to inverter 15. In FIG. 2, vertical axes represent the voltages or power, and horizontal axes represent time.

First, when power inverter device 11 starts up at time point t0, inverter 15 generates output AC voltage Vac shown in FIG. 2. Output AC voltage Vac has a frequency of 60 Hz and has an effective value of 100V.

Control circuit 15A of inverter 15 detects generated output AC voltage Vac and detects zero cross point Vac0 in one cycle from time point t0 to time point t1. For zero cross detection duration P0 from time point t0 at the starting-up to time point t1 at which zero cross point Vac0 is detected, control circuit 15A does not allow capacitor circuit 19 to operate and causes capacitor voltage Vc output from capacitor circuit 19 to be 0V.

For zero cross detection duration P0 from time point t0 to time point t1, capacitor circuit 19 does not operate and thus an operation for reducing the ripple power is not performed. Thus, as shown in FIG. 2, for zero cross detection duration P0, peaks of input power Pi input to inverter 15 periodically appear and increase with lapse of time, thus producing high ripple power. As described above, since the fluctuation of input power Pi increases with lapse of time, the accuracy of the AC conversion by inverter 15 may be influenced possibility.

In power inverter device 11 in accordance with Embodiment 1, in order to reduce the ripple power of input power Pi early, control circuit 15A of inverter 15 starts the operation of capacitor circuit 19 at time point t2 at which predetermined waiting time TD1 lapses from time point t1 at which zero cross point Vac0 is detected. Then, control circuit 15A generates a capacitor voltage shifted to be advanced substantially from output AC voltage Vac by π/4 radian, as shown in FIG. 2. Supplying capacitor voltage Vc to inverter 15 after time point t2, control circuit 15A prevents input power Pi from having the peaks increasing with lapse of time after time point t2, thus stabilizing input power Pi. Predetermined waiting time TD1 is a duration equal to 3π/4 radian of the phase of output AC voltage Vac.

An operation of power inverter device 11 to stabilize input power Pi at an early stage after the starting-up will be described below.

At time point t2, output AC voltage Vac lowers temporally. At time point t2 during a steady-state operation (i.e., for a duration in which power inverter device 11 is stably driven with small ripple), capacitor voltage change Vci which is a change of capacitor voltage Vc having a phase shifted to be advanced substantially by π/4 radian from output AC voltage Vac lowers with lapse of time.

At time point t2 at which predetermined waiting time TD1 lapses from zero cross point Vac0, capacitor voltage Vc is 0. Predetermined waiting time TD1 is a duration substantially equal to 3π/4 radian of the phase of output AC voltage Vac. Control circuit 15A allows capacitor circuit 19 to start operating from time point t2 so as to start the charging of capacitor 19A of capacitor circuit 19. As described above, since output AC voltage Vac lowers with lapse of time at time point t2, capacitor 19A is charged such that capacitor voltage Vc changes toward a negative value. Thus, charging voltage change Vcj which is a change of a voltage for charging capacitor 19A lowers with lapse of time to charge capacitor 19A. As shown in FIG. 2, voltage changes Vci and Vcj at time point t2 are added since voltage changes Vci and Vcj is directed in the same changing direction.

Thus, from time point t2, capacitor voltage change Vci of capacitor voltage Vc for changing the ripple power during the steady operation changes in the same direction as a direction along which charging voltage change Vcj of capacitor 19A changes. Thus, from time point t2, a change of a voltage obtained by combining voltage changes Vci and Vcj is in the same direction as a direction along which capacitor voltage Vc changes during the steady operation. In other words, during the steady operation of capacitor 19A charged and discharged repetitively, capacitor 19A is originally charged in a negative potential direction at time point t2. At this time, i.e., when waiting time TD1 equal to 3π/4 radian from zero cross point Vac0 lapses, capacitor voltage Vc shifted to be advanced substantially by π/4 radian can be generated from capacitor circuit 19 and the supply of capacitor voltage Vc to inverter 15 can be started, thereby immediately reducing the ripple power of input power Pi at this moment. The above operation allows power inverter device 11 to reduce the ripple power at an early stage.

In the above description, in the case that waiting time TD1 equal to a duration from zero cross point Vac0 to 3π/4 radian lapses, control circuit 15A allows capacitor circuit 19 to start operating. Predetermined waiting time TD1 may not be a duration exactly equal to 3π/4 radian of the phase of the output AC voltage Vac, but may be a duration substantially equal to 3π/4 radian of the phase of the output AC voltage Vac within an error range.

From time point t2, as shown in FIG. 2, the ripple power of input power Pi is reduced. In the subsequent cycles (from time point t3 to time point t4, from time point t4 to time point t5, from time point t5 to time point t6, from time point t6 to time point t7, . . . ), the ripple power is suppressed continuously.

The timing at which capacitor circuit 19 starts up is not limited to time point t2 at which waiting time TD1 substantially equal to 3π/4 radian from zero cross point Vac0 of output AC voltage Vac lapses. Control circuit 15A may start up capacitor circuit 19 at a time preceding time point t2 by 1 cycle or more. In this case, the ripple power also can be reduced, due to the above reason, at an early stage after the starting-up of capacitor circuit 19. Thus, control circuit 15A of inverter 15 allows, when predetermined waiting time TD1 lapses from zero cross point Vac0 of output AC voltage Vac of the AC power after the starting-up, capacitor circuit 19 to start supplying capacitor voltage Vc having a phase shifted substantially by π/4 radian from output AC voltage Vac. Predetermined waiting time TD1 is a duration substantially equal to the 2πn+3π/4 radian of the phase of output AC voltage Vac (n is an integer not smaller than zero). This configuration can be applied to power inverter device 11 having a specification according to which no problem is caused by the ripple power of input power Pi generated over n cycles during which capacitor circuit 19 does not operate. However, when the starting-up of capacitor circuit 19 is delayed, input power Pi is superposed with the ripple power for the duration until capacitor circuit 19 starts up (e.g., a duration from time point t1 to time point t2 shown in FIG. 2). Thus, integer n is desirably small.

Figure 3:
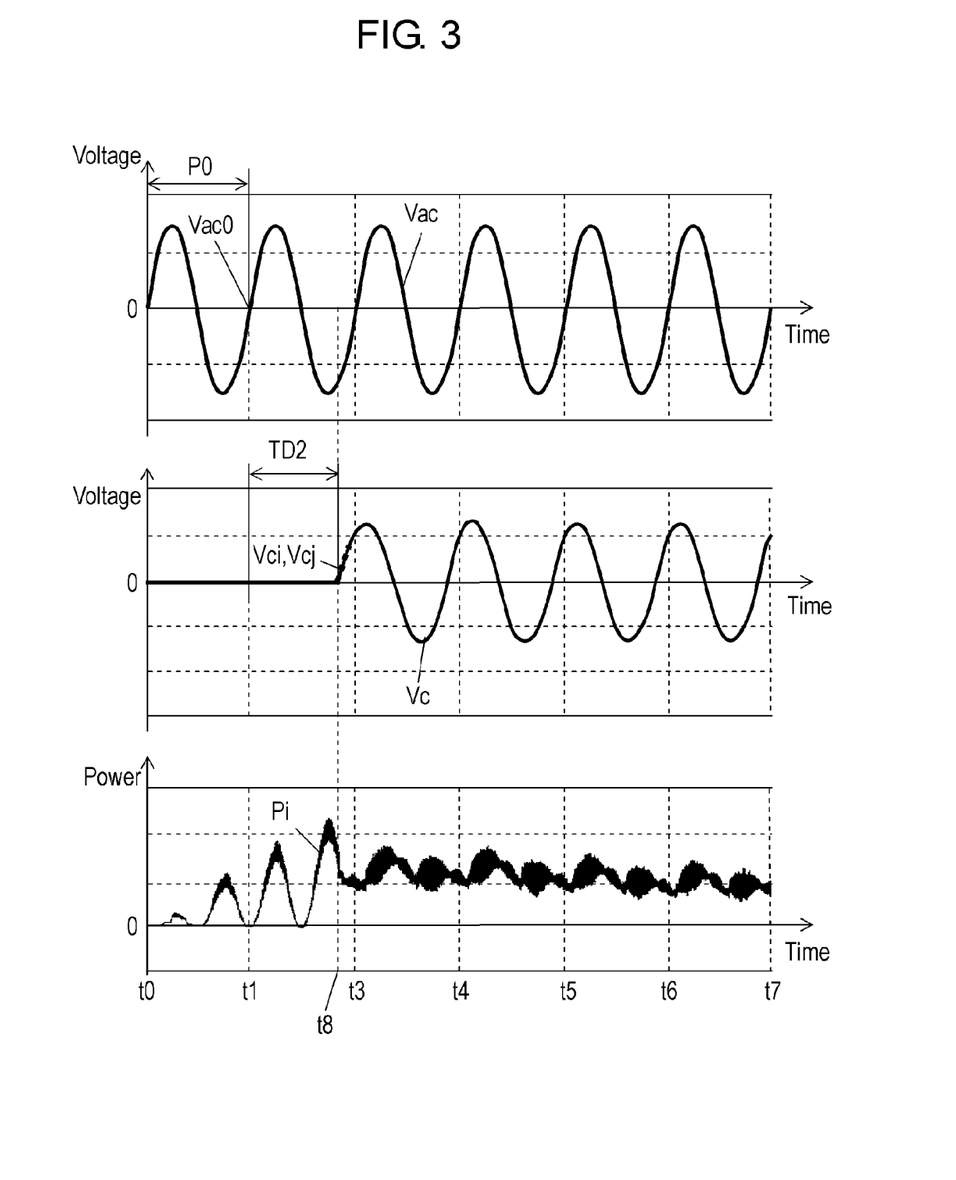
FIG. 3 illustrates other signals of the power inverter device in accordance with Embodiment 1.

Next, another operation of power inverter device 11 to reduce the ripple power of input power Pi at an early stage will be described below. FIG. 3 illustrates signals in the operation of power inverter device 11. In FIG. 3, items identical to those of the signals shown in FIG. 2 are denoted by the same reference numerals.

First, when power inverter device 11 starts up at time point t0, inverter 15 generates output AC voltage Vac shown in FIG. 3. Output AC voltage Vac has a frequency of 60 Hz and has an effective value of 100V.

Control circuit 15A of inverter 15 detects generated output AC voltage Vac and detects zero cross point Vac0 in one cycle from time point t0 to time point t1. For zero cross detection duration P0 by which zero cross point Vac0 is detected, capacitor circuit 19 does not operate and capacitor voltage Vc remains 0, as shown in FIG. 3. Thus, power inverter device 11 does not perform an operation to reduce ripple power. Peaks of input power Pi periodically appearing increase with lapse of time, as shown in FIG. 3. This causes an increase of a fluctuation of input power Pi, thus adversely influencing the accuracy of the AC conversion by inverter 15.

As shown in FIG. 3, in order to reduce the ripple power of input power Pi at an early stage, control circuit 15A starts the operation of capacitor circuit 19 at a time point at which predetermined waiting time TD2 lapses from time point t1 at which zero cross point Vac0 is detected. Control circuit 15A causes capacitor circuit 19 to generate capacitor voltage Vc having a phase shifted to be advanced substantially by π/4 radian from output AC voltage Vac, as shown in FIG. 3 and starts supplying capacitor voltage Vc to inverter 15. Predetermined waiting time TD2 is a duration equal to 7π/4 radian of the phase of output AC voltage Vac. Supplying capacitor voltage Vc to inverter 15, control circuit 15A prevents input power Pi after time point t8 from having the peaks increasing with lapse of time, and, stabilizes input power Pi, as shown in FIG. 3.

An operation to stabilize input power Pi immediately after the starting-up power inverter device 11 will be described below.

At time point t8, output AC voltage Vac increases with lapse of time. Capacitor voltage change Vci which is a change of capacitor voltage Vc at time point t8 during the steady operation also increases with lapse of time.

At time point t8 at which a duration equal to $7\pi/4$ radian lapses from zero cross point Vac0, capacitor voltage Vc is 0. When control circuit 15A allows capacitor circuit 19 to start operating at time point t8, control circuit 15A starts charging capacitor 19A of capacitor circuit 19. As described above, since output AC voltage Vac increases at time point t8 with lapse of time, capacitor 19A is charged in a direction along which capacitor voltage Vc increases toward positive. Thus, charging voltage change Vcj which is a charge of a voltage for charging capacitor 19A increases at time point t8 with lapse of time. As shown in FIG. 3, capacitor voltage change Vci and charging voltage change Vcj change in the same direction from time point t8 and thus, are overlapped.

Due to the above operation, from time point t8, capacitor voltage change Vci of capacitor voltage Vc for changing the ripple power during the steady operation changes in the same direction as a direction along which voltage change Vcj for charging capacitor 19A changes. Thus, from time point t8, a change of a voltage obtained by combining voltage changes Vci and Vcj is in the same direction as a direction along which capacitor voltage Vc changes during the steady operation. In other words, during the steady operation of capacitor 19A charged and discharged repetitively, capacitor 19A is originally charged in a positive potential direction at time point t8. At this timing, i.e., when waiting time TD2 equal to $7\pi/4$ radian from zero cross point Vac0 lapses, capacitor voltage Vc shifted to be advanced substantially by $\pi/4$ radian from output AC voltage Vac can be generated by capacitor circuit 19 and the supply of capacitor voltage Vc to inverter 15 can be started, thereby immediately reducing the ripple power of input power Pi at time point t8. The above operation allows power inverter device 11 to reduce the ripple power at an early stage.

As described above, capacitor circuit 19 is operable, after the starting-up of inverter 15, not to output capacitor voltage Vc for the predetermined waiting time (TD1, TD2) lapses from zero cross point Vac0 of output AC voltage Vac.

In the above description, when waiting time TD2 from zero cross point Vac0 to $7\pi/4$ radian of output AC voltage Vac lapses, control circuit 15A allows capacitor circuit 19 to start operating. However, waiting time TD2 is not strictly limited to a duration equal to $7\pi/4$ radian of output AC voltage Vac, and may be a duration substantially equal to $7\pi/4$ radian of output AC voltage Vac within an error range.

From time point t8, as shown in FIG. 3, the ripple power of input power Pi is reduced. In the subsequent cycles (from time point t3 to time point t4, from time point t4 to time point t5, from time point t5 to time point t6, from time point t6 to time point t7, . . . ), the ripple power is suppressed continuously.

The time at which capacitor circuit 19 is started up not limited to a time point (time point t8) at which a duration substantially equal to $7\pi/4$ radian from zero cross point Vac0 of output AC voltage Vac lapses. Control circuit 15A may start up capacitor circuit 19 at a time preceding time point t8 by 1 cycle or more. In this case, the ripple power can be reduced for the above reason at an early stage after the starting-up of capacitor circuit 19. Specifically, when predetermined waiting time TD2 lapses from zero cross point Vac0 of output AC voltage Vac of the AC power after the starting-up, control circuit 15A of inverter 15 allows capacitor circuit 19 to start supplying capacitor voltage Vc having a phase shifted to be advanced substantially from that of output AC voltage Vac by $\pi/4$ radian. Predetermined waiting time TD2 is a duration substantially equal to $2\pi n+7\pi/4$ radian of the phase of output AC voltage Vac (n is an integer not smaller than zero). This operation can be applied to power inverter device 11 having a specification according to which no problem is caused by the ripple power of input power Pi generated over n cycles required for capacitor circuit 19 to be started up. However, when the starting up of capacitor circuit 19 is delayed, input power Pi contains the ripple power in a duration, such as a duration from time point t1 to time point t8 shown in FIG. 3, until capacitor circuit 19 starts up, and the resultant magnitude is increased. Thus, integer n is desirably small.

As described above, control circuit 15A of inverter 15 is configured such that, after the starting-up, when predetermined waiting time (TD1, TD2) lapses from zero cross point Vac0 of voltage Vac of AC power, capacitor circuit 19 starts supplying, to inverter 15, capacitor voltage Vc having a phase shifted to be advanced substantially by $\pi/4$ radian from output AC voltage Vac. Predetermined waiting time (TD1, TD2) is a duration substantially equal to $2\pi n+3\pi/4$ radian or $2\pi n+7\pi/4$ radian of the phase of output AC voltage Vac (n is an integer not smaller than zero). This operation can consequently reduce the ripple power added to input power Pi during the starting up.

Figure 4:
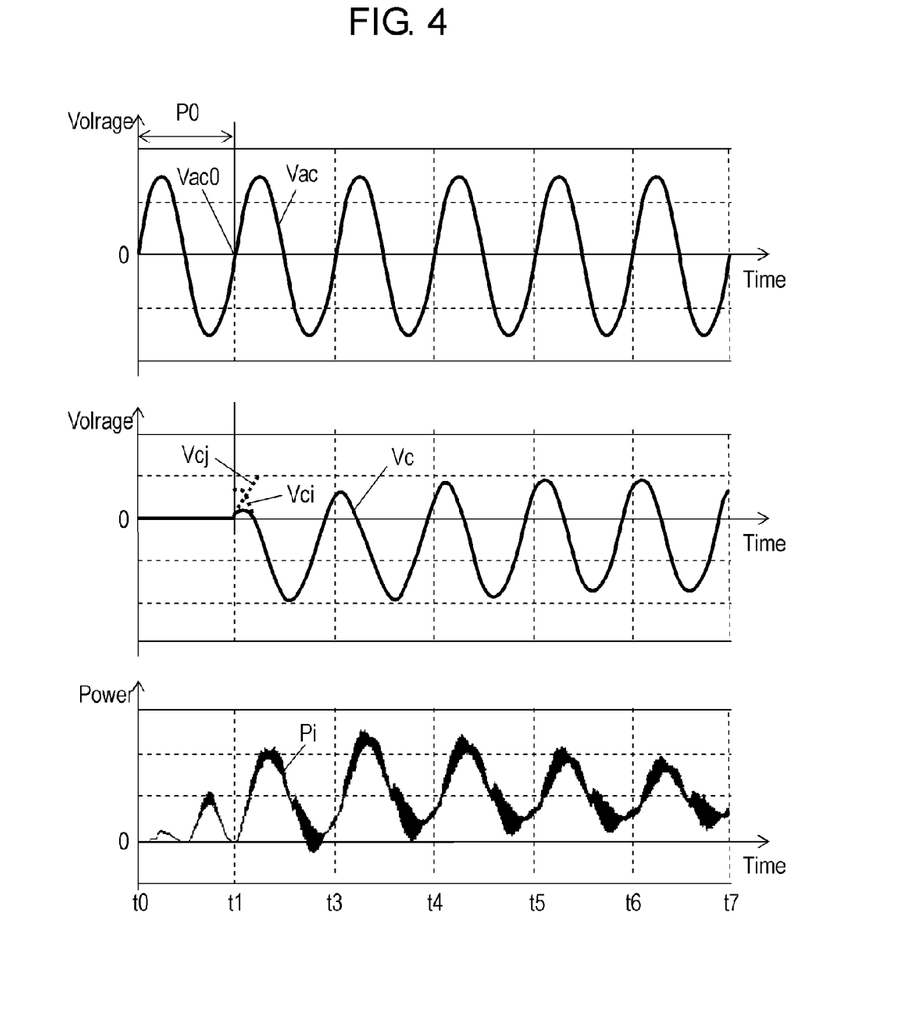
FIG. 4 illustrates a signal of a comparative example of a power inverter device.

FIG. 4 illustrates signals of a comparative example of a power inverter device. In FIG. 4, items identical to those shown in FIG. 2 are denoted by the same reference numerals. In the power inverter device of the comparative example shown in FIG. 4, at time point t1 at which zero cross point Vac0 of output AC voltage Vac is detected, capacitor circuit 19 starts supplying, to inverter 15, capacitor voltage Vc having a phase shifted substantially by $\pi/4$ radian from output AC voltage Vac.

First, when the power inverter device starts up at time point t0, inverter 15 generates output AC voltage Vac shown in FIG. 4. Output AC voltage Vac has a frequency of 60 Hz and an effective value of 100V.

A control circuit of inverter 15 detects generated output AC voltage Vac and detects zero cross point Vac0 in 1 cycle from time point t0 to time point t1. For zero cross detection duration P0 until zero cross point Vac0 is detected, capacitor circuit 19 does not operate and capacitor voltage Vc is 0V, as shown in FIG. 4. Thus, an operation for reducing a ripple power is not performed. Thus, input power Pi input to inverter 15 has peaks which periodically appearing and increases with lapse of time.

The control circuit starts the operation of capacitor circuit 19 immediately at time point t1 at which zero cross point Vac0 is detected. Thus, as shown in FIG. 4, capacitor circuit 19 generates capacitor voltage Vc shifted substantially by $\pi/4$ radian from output AC voltage Vac. In this case, capacitor voltage Vc has a waveform different from that of capacitor voltage Vc in a steady operation.

At time point t1, as shown in FIG. 4, output AC voltage Vac increases with lapse of time. Since capacitor voltage Vc is shifted substantially by $\pi/4$ radian from output AC voltage Vac, capacitor voltage change Vci which is a change of capacitor voltage Vc at time point t1 during a steady operation is lower than a peak voltage at a point before the peak. From time point t1, capacitor voltage change Vci during the steady operation exhibits a peak, and then, lowers with lapse of time.

As shown in FIG. 4, at time point t1 at which zero cross point Vac0 is detected, capacitor voltage Vc is 0. When the control circuit allows capacitor circuit 19 to operate from time point t1, the charging of capacitor 19A of capacitor circuit 19 is started. As described above, since output AC voltage Vac increases at time point t1 with lapse of time, capacitor 19A is charged in a direction along which capacitor voltage Vc increases toward positive. Thus, as shown in FIG. 4, charging voltage change Vcj which is a change of the voltage for charging capacitor 19A increases with lapse of time.

Therefore, from time point t1, the direction of capacitor voltage change Vci as a change of capacitor voltage Vc for reducing the ripple power during a steady operation is different from a direction of charging voltage change Vcj as a change of a voltage for charging capacitor 19A. Thus, from time point t1, a voltage change obtained by combining voltage changes Vci and Vcj increases once and then lowers, as shown in FIG. 4. Then, the peak value and an average value of capacitor voltage Vc gradually increase over many cycles with lapse of time. When capacitor voltage Vc shown in FIG. 4 is supplied from capacitor circuit 19 to inverter 15, as shown in FIG. 4, the ripple power of input power Pi is generated continuously after time point t1. However, the ripple power of input power Pi shown in FIG. 4 tends to temporally lower. Thus, the ripple power is finally reduced after some time due to the impedance of the power inverter device. In this case, in order to obtain the stable ripple power, as shown in FIGS. 2 and 3, about several tens of seconds are required depending on the specification of the power inverter device. Thus, in the operation during the starting up by a signal shown in FIG. 4, the ripple power is not stabilized immediately after the starting up.

Figure 5A:
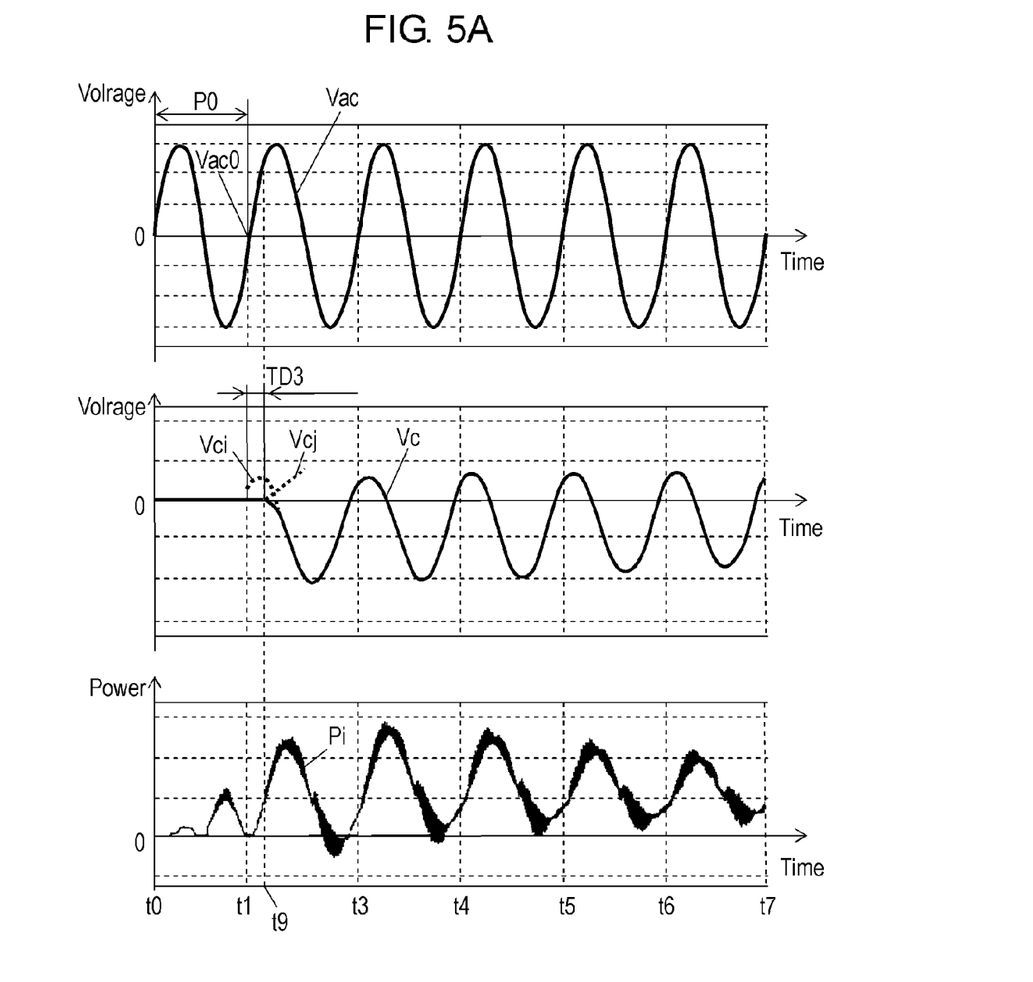
FIG. 5A illustrates a signal of another comparative example of a power inverter device.

FIG. 5A illustrates a signal of the power inverter device of another comparative example. In FIG. 5A, items identical to those of FIG. 2 are denoted by the same reference numerals. In the power inverter device operated based on the signal shown in FIG. 5A, at a point (time point t9) at which a duration substantially corresponding to $\pi/4$ radian passes from zero cross point Vac0 of output AC voltage Vac, capacitor voltage Vc having a phase shifted substantially by $\pi 4$ radian from output AC voltage Vac is supplied from capacitor circuit 19 to inverter 15.

First, when power inverter device 11 is started up at time point t0, inverter 15 generates output AC voltage Vac. Output AC voltage Vac has a frequency of 60 Hz and an effective value of 100V.

The control circuit of inverter 15 detects generated output AC voltage Vac and detects zero cross point Vac0 at one cycle from time point t0 to time point t1. For zero cross detection duration P0 until zero cross point Vac0 is detected, capacitor circuit 19 does not operate and capacitor voltage Vc remains 0V as shown in FIG. 5A. Thus, an operation for reducing ripple power is not performed. Thus, peaks of input power Pi periodically appearing increase with lapse of time, as shown in FIG. 5A.

Then, time point t9 at which predetermined waiting time TD3 passes from zero cross point Vac0, the control circuit starts the operation of capacitor circuit 19. As a result, as shown in FIG. 5A, capacitor circuit 19 generates capacitor voltage Vc having a phase shifted substantially by $\pi/4$ radian from output AC voltage Vac. Predetermined waiting time TD3 is a duration substantially corresponding to $\pi/4$ radian of the phase of output AC voltage Vac. In this case, generated capacitor voltage Vc is different from capacitor voltage Vc during a steady state.

At time point t9, output AC voltage Vac increases with lapse of time. On the other hand, capacitor voltage change Vci as a change of capacitor voltage Vc at time point t9 during a steady operation lowers.

As shown in FIG. 5A, at time point t9 at which waiting time TD3 substantially corresponding to $\pi/4$ radian passes from zero cross point Vac0, capacitor voltage Vc is 0. When the control circuit allows capacitor circuit 19 to operate at time point t9, the charging of capacitor 19A of capacitor circuit 19 is started. As described above, since output AC voltage Vac increases at time point t9 with lapse of time, capacitor 19A is charged in a direction such that capacitor voltage Vc increases. Thus, charging voltage change Vcj increases with lapse of time that is a change of the voltage for charging capacitor 19A shown in FIG. 5A.

Figure 5B:
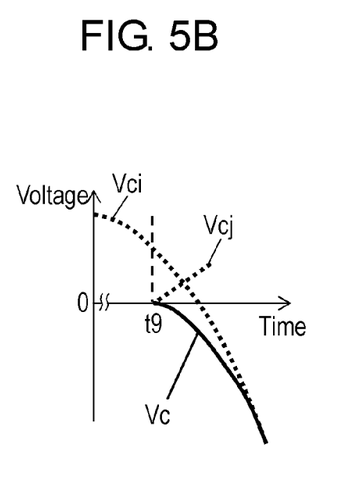
FIG. 5B is an enlarged view illustrating the signal shown in FIG. 5A.

FIG. 5B shows capacitor voltage change Vci, charging voltage change Vcj, and capacitor voltage Vc around time point t9. From time point t9, capacitor voltage change Vci as a change of capacitor voltage Vc lowers with lapse of time and charging voltage change Vcj increases with lapse of time. However, capacitor voltage change Vci lowers at a higher rate than that at which charging voltage change Vcj increases. Hence, from time point t9, a waveform obtained by combining voltage changes Vci and Vcj lowers gradually, as shown in FIG. 5B. Then, as shown in FIG. 5A, values of the peaks and the average value of capacitor voltage Vc increase with lapse of time for a lot of cycles. When capacitor voltage Vc shown in FIG. 5A is supplied from capacitor circuit 19 to inverter 15, from time point t9, the ripple power of input power Pi input to inverter 15 occurs continuously. However, the ripple power of input power Pi is finally reduced after a certain time due to the impedance of power inverter device 11. In this case, in order to obtain the stable ripple power as shown in FIGS. 2 and 3, about several tens of seconds are required depending on the specification of power inverter device 11. Thus, in the operation during the activation by a signal shown in FIG. 5A, the ripple power is not stabilized immediately after the starting up.

As above, when the starting up of power inverter device 11 is followed by the start of the supply by capacitor circuit 19 at zero cross point Vac0 of output AC voltage Vac shown in FIG. 4 of capacitor voltage Vc having a phase shifted substantially by $\pi/4$ radian, input power Pi has a large ripple power. After zero cross point Vac0 of output AC voltage Vac detection shown in FIG. 5A, input power Pi also has large ripple power when capacitor circuit 19 starts supplying capacitor voltage Vc having a phase shifted substantially by $\pi/4$ radian from output AC voltage Vac when waiting time TD3 substantially corresponding to $\pi/4$ radian passes.

In power inverter device 11 in accordance with Embodiment 1, control circuit 15A of inverter 15 causes, when predetermined waiting time (TD1, TD2) passes after starting up from zero cross point Vac0 of output AC voltage Vac of AC power, capacitor circuit 19 to start supplying capacitor voltage Vc having a phase shifted to be advanced substantially by $\pi/4$ radian from output AC voltage Vac. Predetermined waiting time (TD1, TD2) is a duration substantially corresponding to $2n\pi+3\pi/4$ radian or $2\pi n+7\pi/4$ radian of the phase of output AC voltage Vac (n is an integer not smaller than zero). As a result, a direction along which capacitor voltage Vc (charging voltage change Vcj) changes during the initial charging of the capacitor 19A of capacitor circuit 19 matches a direction along which capacitor voltage Vc (capacitor voltage change Vci) changes during the stable driving of power inverter device 11. As a result, when capacitor circuit 19 starts supplying, to inverter 15, capacitor voltage Vc having a phase shifted to be advanced substantially by π/4 radian from output AC voltage Vac, capacitor voltage Vc substantially equal to capacitor voltage Vc during a stable driving is supplied, thus immediately stabilizing the ripple power. Therefore, power inverter device 11 can reduce the ripple power at an early stage after starting up.

Exemplary Embodiment 2

Figure 6A:
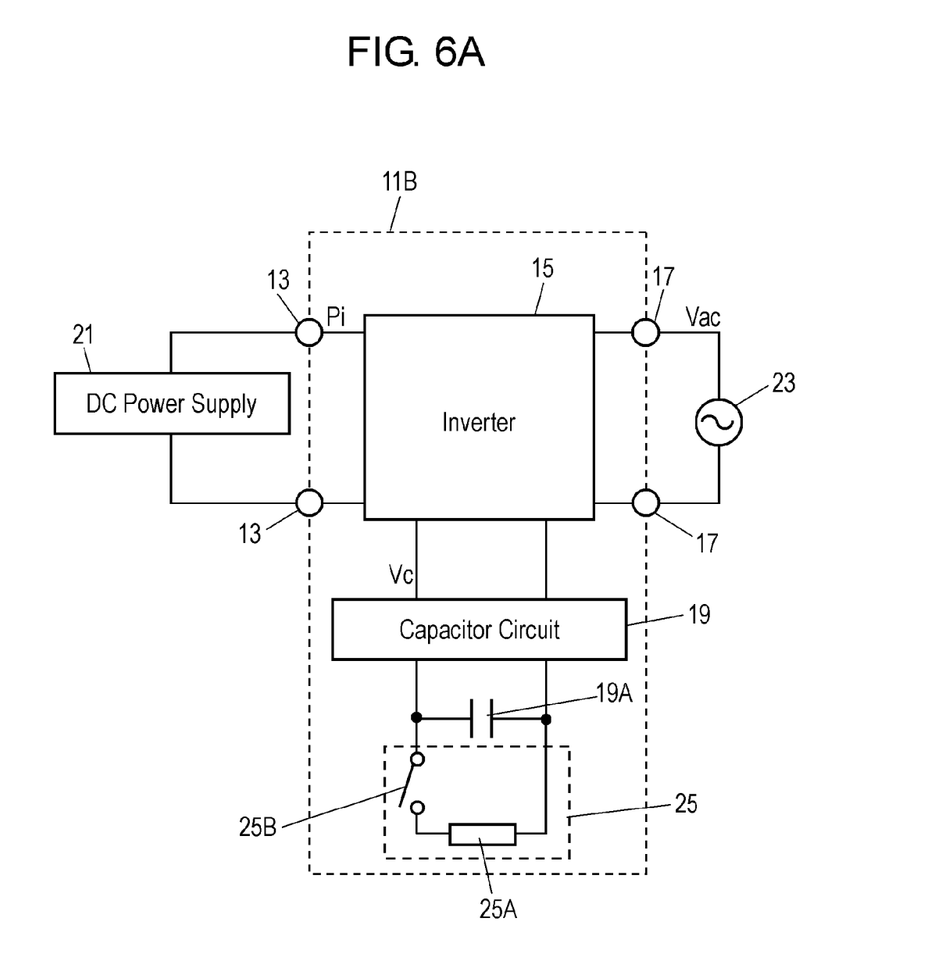
FIG. 6A is a block diagram of the power inverter device in accordance with Exemplary Embodiment 2 of the present invention.

FIG. 6A is a block diagram of power inverter device 11B in accordance with Exemplary Embodiment 2 of the present invention. In FIG. 6A, items identical to those of power inverter device 11 in accordance with Embodiment 1 shown in FIG. 1 are denoted by the same reference numerals.

Power inverter device 11B in accordance with Embodiment 2 is configured so that power inverter device 11 in accordance with Embodiment 1 shown in FIG. 1 further includes discharge circuit 25 electrically connected to capacitor circuit 19. When the use of power inverter device 11B is completed, discharge circuit 25 discharges capacitor 19A of capacitor circuit 19 at an early stage. Thus, capacitor 19A is prevented from having a remaining charge during the restart-up of power inverter device 11B, thus reducing the ripple power of input power Pi more securely.

A configuration of power inverter device 11B in accordance with Embodiment 2 will be detailed below. Discharge circuit 25 is electrically connected to capacitor circuit 19. Specifically, discharge circuit 25 is connected to both ends of capacitor 19A. Discharge circuit 25 includes a series circuit including discharge resistor 25A and switch 25B which are connected in series. Switch 25B includes a transistor. Switch 25B is also electrically connected to control circuit 15A of inverter 15. Thus, switch 25B is switched to be turned on and off by control circuit 15A.

An operation of power inverter device 11B will be described below.

First, power inverter device 11B in accordance with Embodiment 2 operates similarly as power inverter device 11 in accordance with Embodiment 1 during starting up and a normal operation.

When the operation of power inverter device 11B is completed, control circuit 15A operates to stop the operation of inverter 15 and to turn on switch 25B of discharge circuit 25. As a result, both ends of capacitor 19A are connected to discharge resistor 25A, thus rapidly discharging capacitor 19A via discharge resistor 25A. Switch 25B is not limited to a transistor but may be configured by a switch such as another semiconductor switch element, or relay, that can be externally turn on and off The resistance of discharge resistor 25A and the capacitance of capacitor 19A are previously stored in the memory of control circuit 15A. Based on these values, control circuit 15A can calculate a discharge-completed duration at which discharging is completed. Control circuit 15A turns off switch 25B when the calculated discharge-completed duration passes from a time when switch 25B is turned on. The above operation can rapidly discharge the charge stored in capacitor 19A.

As described above, when power inverter device 11B is restarted, the voltage of capacitor 19A and capacitor voltage Vc are 0V. Thus, the ripple power can be reduced more securely by the operation, similarly to power inverter device 11 in accordance with Embodiment 1.

In the case that power inverter device 11 does not include discharge circuit 25, charge remains in capacitor 19A in a duration from the completion of the use to the completion of the self discharge of capacitor 19A. If restarting is performed during this, since capacitor voltage Vc is not 0V, capacitor voltage Vc may be shifted from the signal shown in FIGS. 2 and 3 in accordance with Embodiment 1, even when the power inverter device is started. In this case, capacitor voltage Vc is stabilized for a time during which the ripple power cannot be reduced. Thus, when capacitor 19A has a large capacitance or when capacitor 19A has a high internal resistance value, discharge circuit 25 in accordance with Embodiment 2 is effective.

The configuration and operation as described above can discharge, when the use of power inverter device 11B is completed, the charge of capacitor 19A of capacitor circuit 19 at an early stage. This can consequently reduce the possibility where capacitor 19A includes therein remaining charge during the reactivation of power inverter device 11B, thus reducing the ripple power more securely.

In accordance with Embodiment 2, control circuit 15A calculates the discharge-completed duration of capacitor 19A. Control circuit 15A may calculate the discharge-completed duration before storing the discharge-completed duration. In this case, the time required for the calculation by control circuit 15A, thus providing an easier control.

Discharge circuit 25 discharges capacitor 19A until inverter 15 is started up. Alternatively, discharge circuit 25 may discharge capacitor 19A until a time at which predetermined waiting time (TD1, TD2) passes from zero cross point Vac0 of output AC voltage Vac.

Figure 6B:
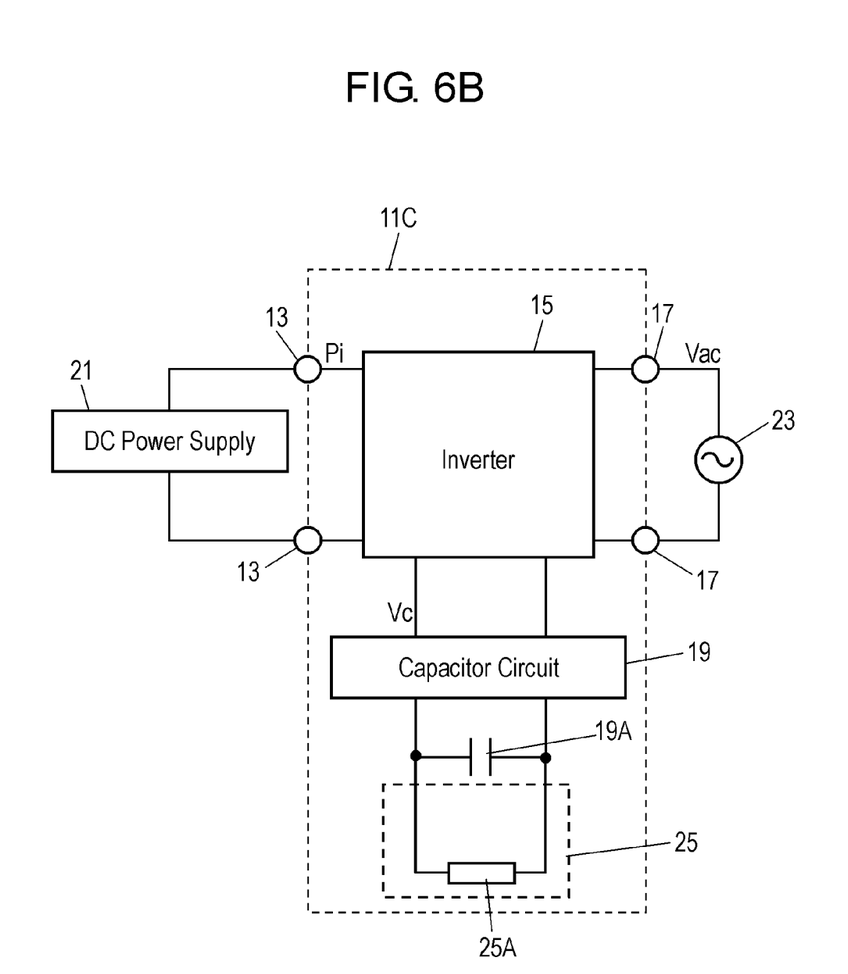
FIG. 6B is a block diagram of another power inverter device in accordance with Embodiment.

FIG. 6B is a block diagram of another power inverter device 11C in accordance with Embodiment 2. In FIG. 6B, components identical to those of power inverter device 11B shown in FIG. 6A are denoted by the same reference numerals. In power inverter device 11B shown in FIG. 6A, discharge circuit 25 includes a series circuit including switch 25B and discharge resistor 25A which are connected in series to each other. In power inverter device 11C shown in FIG. 6B, discharge circuit 25 does not include switch 25B but includes discharge resistor 25A. In power inverter device 11C, a discharge-completed duration is uniquely determined. For the discharge-completed duration, the discharge of capacitor 19A is completed according to the capacitance of capacitor 19A and the resistance of discharge resistor 25A. Depending on the discharge-completed duration, a duration until power inverter device 11C is restarted can be defined. Control circuit 15A operates so as not to restart power inverter device 11C for the duration. This operation can eliminate switch 25B and the control thereof, thus simplifying the circuit configuration and control. However, since this configuration causes a current to be always flow in discharge resistor 25A, such a configuration is desired that increases the resistance of discharge resistor 25A within a range in which the efficiency of power inverter device 11C is not significantly influenced.

The specific values of the frequency and the effective value output AC voltage Vac in accordance with Embodiments 1 and 2 are merely examples. Thus, the invention is not limited to these values.

In Embodiments 1 and 2, power inverter devices 11, 11B, and 11C convert the DC voltage from the DC power source to the AC voltage to output the AC voltage. However, the invention is not limited to this and may be applied to a general inverter circuit.

INDUSTRIAL APPLICABILITY

A power inverter device according to the present invention can reduce ripple power during starting at an early stage, thus being useful as a power inverter device for converting DC power to AC power in particular.

REFERENCE MARKS IN DRAWINGS 11, 11B, 11C power inverter device
15 inverter
19 capacitor circuit
19A capacitor
25 discharge circuit
Vac output AC voltage
Vac0 zero cross point
Vc capacitor voltage

The invention claimed is:

1. A power inverter device comprising:
   an inverter that converts a direct-current (DC) power to an alternating-current (AC) power having an output AC voltage; and
   a capacitor circuit electrically connected to the inverter,
   wherein the capacitor circuit is operable to start supplying a capacitor voltage to the inverter at a time point when a predetermined waiting time lapses from a zero cross point of the output AC voltage at a starting up of the inverter circuit, a phase of the capacitor voltage being shifted substantially by $\pi/4$ radian from a phase of the output AC voltage,
   wherein the inverter is operable to generate the output AC power based on the capacitor voltage and the DC power,
   wherein the predetermined waiting time is a duration equal to $2\pi n+3\pi/4$ radian or $2\pi n+7\pi/4$ radian of a phase of the output AC voltage, n being an integer not smaller than zero, and
   wherein the capacitor circuit is operable not to output the capacitor voltage for a duration from the starting-up of the inverter to the time point when the predetermined waiting time lapses from the zero cross point of the output AC voltage.

2. The power inverter device according to claim 1, further comprising a discharge circuit that discharges the capacitor.

3. The power inverter device according to claim 2, wherein the discharge circuit discharges the capacitor before a time of the starting-up of the inverter.

4. The power inverter device according to claim 2, wherein the discharge circuit discharges the capacitor before the time point when the predetermined waiting time lapses from the zero cross point of the output AC voltage.

5. The power inverter device according to claim 1, wherein the capacitor is configured to be charged by power supplied from the inverter.

6. The power inverter device according to claim 1, wherein the phase of the capacitor voltage is advanced substantially by $\pi/4$ radian from the phase of the output AC voltage.

* * * * *